(12) United States Patent
Panzram et al.

(10) Patent No.: US 9,340,286 B2
(45) Date of Patent: May 17, 2016

(54) AUTOMATIC TRANSPORT DEVICE FOR CARGO LOADING SYSTEM

(71) Applicant: Airbus Operations GmbH, Hamburg (DE)

(72) Inventors: Uwe Panzram, Hamburg (DE); Sascha Nowarre, Hamburg (DE); Hans-Joachim Schoen, Hamburg (DE); Claudio Uriarte, Bremen (DE); Patrick Dittmer, Bremen (DE); Thies Andreas Ernst-Friedrich Beinke, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 43 days.

(21) Appl. No.: 14/516,788

(22) Filed: Oct. 17, 2014

(65) Prior Publication Data

US 2015/0108276 A1   Apr. 23, 2015

(30) Foreign Application Priority Data

Oct. 23, 2013   (EP) .................................... 13 189 917

(51) Int. Cl.
*B64D 9/00* (2006.01)
*B64C 1/20* (2006.01)

(52) U.S. Cl.
CPC ... *B64D 9/00* (2013.01); *B64C 1/20* (2013.01); *B64D 2009/006* (2013.01); *Y02T 50/46* (2013.01)

(58) Field of Classification Search
CPC ...... B64D 9/00; B64D 2009/006; B64C 1/20; B60P 1/52; B65G 37/00
USPC ....................................................... 414/207
See application file for complete search history.

(56) References Cited

U.S. PATENT DOCUMENTS

| | | | | |
|---|---|---|---|---|
| 3,709,450 A | * | 1/1973 | Watts ....................... | B64D 9/00 244/137.3 |
| 3,899,092 A | * | 8/1975 | Nordstrom ................ | B60P 1/52 244/137.1 |
| 4,541,768 A | * | 9/1985 | Walker ..................... | B64F 1/32 193/35 MD |
| 4,544,319 A | * | 10/1985 | Folling ..................... | B64D 9/00 198/457.03 |
| 4,860,973 A | * | 8/1989 | Fenner ..................... | B64C 1/22 198/463.3 |
| 4,929,133 A | | 5/1990 | Wiseman | |
| 5,000,646 A | * | 3/1991 | Pietropaoli .............. | B64D 9/00 244/137.1 |

(Continued)

FOREIGN PATENT DOCUMENTS

| EP | 1086910 A1 | 3/2001 |
|---|---|---|
| EP | 2361855 A2 | 8/2011 |

(Continued)

OTHER PUBLICATIONS

European Patent Office, Extended European Search Report for European Patent Application No. EP 13189917.1 mailed on May 8, 2014.

*Primary Examiner* — Kaitlin Joerger
(74) *Attorney, Agent, or Firm* — Ingrassia Fisher & Lorenz, P.C.

(57) ABSTRACT

An automated transport device for moving a cargo unit within an aircraft cargo compartment is provided. The transport device comprises a base body and shifting means, wherein the base body is to carry the cargo unit. The shifting means is to generate a movement of the base body along a floor of the cargo compartment perpendicular to the longitudinal axis of the aircraft and, after that, along the longitudinal axis of the aircraft without rotation of the base body.

15 Claims, 6 Drawing Sheets

(56) References Cited

U.S. PATENT DOCUMENTS

| | | | |
|---|---|---|---|
| 5,957,640 A | 9/1999 | Schmieke et al. | |
| 6,517,028 B2 * | 2/2003 | Huber | B64D 9/00 244/118.1 |
| 7,589,608 B2 | 9/2009 | Decker et al. | |
| 7,785,056 B2 * | 8/2010 | Sanford | B64D 9/00 414/392 |
| 8,788,085 B2 | 7/2014 | Panzram et al. | |
| 2013/0297065 A1 | 11/2013 | Huber | |
| 2014/0367515 A1 * | 12/2014 | Lohmann | B64D 9/003 244/118.1 |
| 2014/0377043 A1 * | 12/2014 | Panzram | B65G 67/00 414/395 |
| 2015/0225082 A1 * | 8/2015 | Levron | B64D 9/00 244/137.1 |

FOREIGN PATENT DOCUMENTS

| | | | | |
|---|---|---|---|---|
| FR | 2682930 A1 * | 4/1993 | | A61G 1/06 |
| GB | 1326304 A | 8/1973 | | |

* cited by examiner

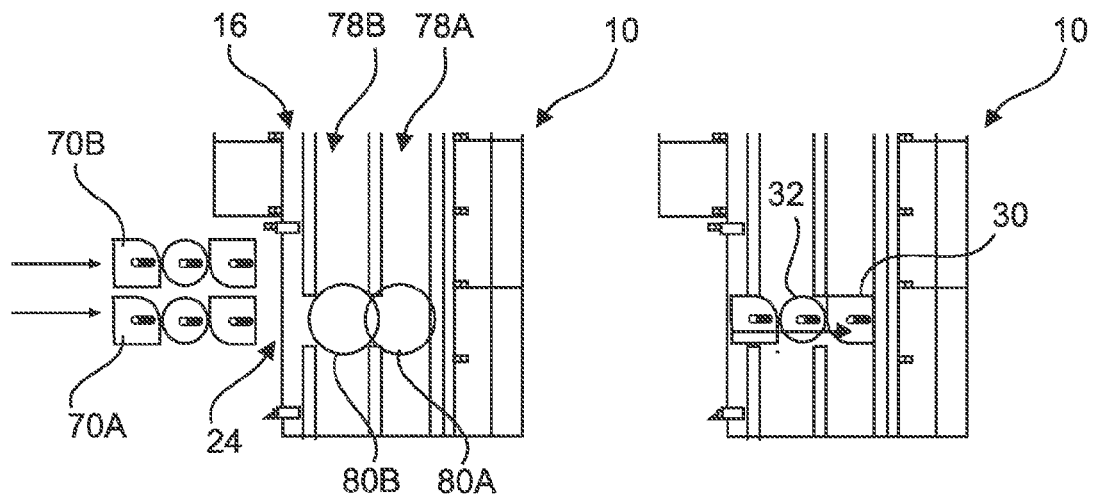
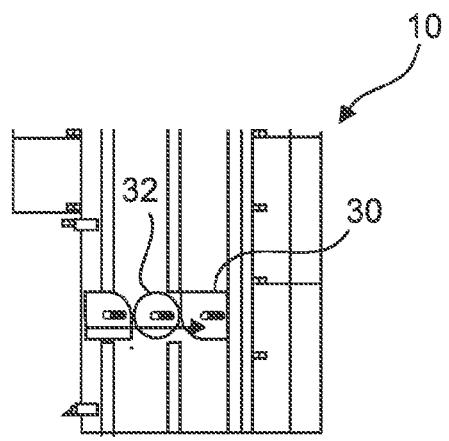
Fig. 5A
Fig. 5B
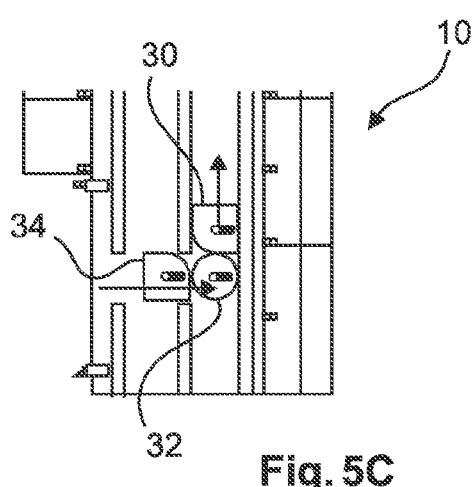
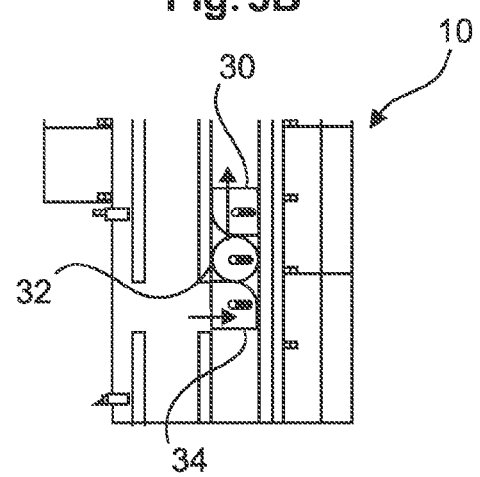
Fig. 5C
Fig. 5D
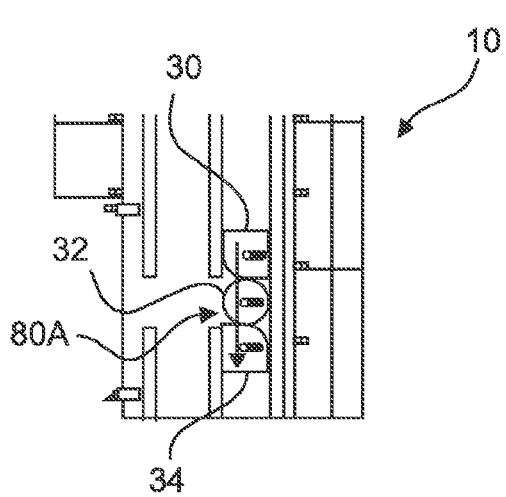
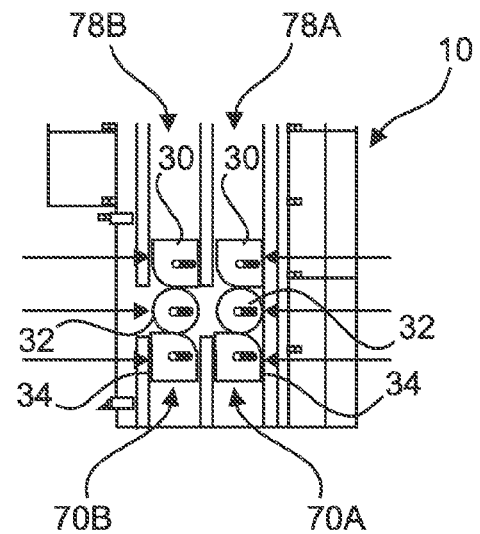
Fig. 5E
Fig. 5F

AUTOMATIC TRANSPORT DEVICE FOR CARGO LOADING SYSTEM

CROSS-REFERENCE TO RELATED APPLICATIONS

This application claims priority to European Patent Application No. 13 189 917.1 filed Oct. 23, 2013, which is incorporated herein by reference in its entirety.

TECHNICAL FIELD

The technical field relates to aircraft and transportation of cargo within aircraft. More specifically, the technical field relates to an automated transport device for moving a cargo unit within an aircraft cargo compartment, a transportation arrangement, and a method for providing a transportation arrangement on a floor of a cargo compartment and for loading a cargo unit into the cargo compartment of an aircraft.

BACKGROUND

For transportation of cargo within aircraft, specially designed and formed containers can be used to efficiently use an existing space in a cargo compartment of an aircraft. For this purpose, unit load devices (ULD) are used to allow a standardization of equipment used for moving and loading such ULDs. At the same time, the shape of the ULDs may be adapted to the respective cross-sectional shape of the cargo compartment of the aircraft. Once the ULDs are filled with cargo, for instance passenger luggage, food and beverages for cabin services, or other cargo, the ULDs may be moved in front of an entrance door of the cargo compartment of the aircraft. In a next step, a loading vehicle may lift and position the ULDs directly in front of the entrance door. After that, the ULD may be moved by an operator or ground staff, along the cargo compartment floor to a target position. Other systems include for instance electromechanical drives in the floor surface in order to forward ULDs without human intervention to a target position.

In order to avoid any movement of ULDs during the flight, the ULDs may be locked at the target position, for instance using locking devices on the cargo compartment floor. Such locking devices can be adapted as latches, which may engage with a bottom plate of the ULD.

In a typical ground operation cycle, the time to load and unload cargo from an aircraft may be limited, however, at the same time complexity of the process as well as the number of ULDs to be loaded or unloaded may increase.

WO 2012/025495 A1 describes a loading and unloading of cargo in transport means and a cargo loading system having a fully automated conveyor system and a fully automated bolt system for locking the cargo unit.

In addition, other objects, desirable features and characteristics will become apparent from the subsequent summary and detailed description, and the appended claims, taken in conjunction with the accompanying drawings and this background.

SUMMARY

The various teachings of the present disclosure increase flexibility of an aircraft loading and unloading system and lower a weight of cargo compartments.

According to one embodiment of the present disclosure, an automated transport device for moving a cargo unit within an aircraft cargo compartment is provided. The automated transport device comprises a base body and shifting means. The base body is adapted to carry a cargo unit. The shifting means is adapted to generate a movement of the base body along a floor of the cargo compartment perpendicular to the longitudinal axis of the aircraft and, after that, along the longitudinal axis of the aircraft without rotation of the base body.

The term "automated" relates to an ability of the transport device to move independently from a physical presence of a human operator or staff. In other words, the transport device may be controlled remotely and may even autonomously move or drive in the aircraft cargo compartment. Thereby, the automated transport device may be controlled, for instance, by a centralized control system. The cargo unit may be, for instance, a ULD, a container, a pallet or similar, generally having a pre-defined shape and dimension.

A base body may be a frame structure or support structure adapted to provide sufficient stability and possibilities to attach further parts or systems.

Shifting means may be any type of drives or forwarding system, which is able to generate a movement of the transport device with an optionally loaded cargo unit. Examples for such shifting means may be, for instance, wheels or rollers with electromechanical drives, chains or drives based on magnetic or air-pressure technology.

A movement of the base body perpendicular to the longitudinal aircraft direction may be used to initially place the transport device at the entrance door of the cargo compartment. Then, without the need for an operator to enter the cargo compartment, the transport device may be moved to a pick-up position, where the transport device can then perform a movement in the longitudinal direction. A movement perpendicular to the longitudinal direction may be of importance, if the transport device is initially positioned for loading a ULD and then move the ULD to a target position. The same perpendicular movement may be performed to remove/unload the transport device from the cargo compartment, for instance, when a loading of all ULDs is concluded. In other words, the movement in perpendicular direction to the longitudinal axis of the aircraft may be used for loading or unloading the transport device into the aircraft cargo compartment, whereas the movement of the base body in longitudinal direction of the aircraft may be used to move ULDs from an entrance door area of an aircraft cargo compartment to a target position.

An advantage of such transport device can be seen in the possibility to remove a majority of moving parts and drives from the cargo compartment floor. Such parts are for instance, ball mats, electromechanical drives for forwarding and shifting the cargo units along an aircraft cargo compartment floor, guiding systems and others. Another advantage is the possibility to remove parts or systems from the aircraft, which are only used on the ground. In other words, the use of a transport device allows a removal of the transport device from the aircraft after finishing the loading or unloading procedure. This may lower cost and the weight of the aircraft. Furthermore, a loading or unloading of cargo may be performed without operators or any other staff within the cargo compartment. A "non-human" cargo system, meaning, beyond other components, a fully-automatic loading, shifting and locking system for cargo, may be possibility using the transport device according to the various teachings of the present disclosure. In this case, this may remove the necessity for an operator to enter the cargo compartment during a typical loading/unloading procedure of an aircraft.

In an embodiment of the present disclosure, the transport device further comprises a coupling for providing an electrical and/or mechanical and/or fluid link to a second transport device. A position of the coupling is displaceable along at least a section of an edge of the base body. An advantage can be seen in a possibility to connect or combine two or more transport devices. In an embodiment, the position of the coupling is displaceable, such that a coupling direction towards the second transport device is changeable by at least 90 degrees.

A coupling may be a stiff or rigid part to provide a mechanical linkage between two transport devices. This may allow a common movement at same speed maintaining a constant distance relative to each other. In other words, a distance between two transport devices may not change and may be maintained equal, even while the transport devices may each move in different directions. Beyond mechanical links, the coupling can also provide a linkage between two transport devices for electrical power or electrical/data signals, or a fluid link such as hydraulic oil, compressed air or similar. The displaceability along an edge of the base body may allow a change of an orientation relative to the cargo compartment, while maintaining the linkage between the transport devices. In other words, a first transport device may begin a movement transversally to a current movement direction of the following transport device, whereas the following transport device continues its movement in the current direction. In this case, the coupling may displace or shift along a certain section of the edge of at least one of the transport devices.

In an embodiment of the present disclosure, the section of the edge has a rounded shape such that the coupling is displaceable along a circular track. An advantage may be seen in the ability of the coupling to change a coupling direction towards a second transport device continuously, while moving along the edge. For example, a circular track may allow a constant or smooth change of both coupling direction and position of the coupling at the edge. Furthermore, a rounded edge may allow a constant movement of a second transport device, while the first transport device starts a movement transversally to the direction of the second transport device. The rounded shape may relate to a top-down view or a rounded shape in horizontal direction parallel to a cargo compartment floor.

According to an embodiment, the transport device further comprises a cargo unit receiving device adapted to lift the cargo unit above the cargo compartment floor level and to lower the cargo unit such that the cargo unit rests on a target position. An advantage may be that a transport device can move, for instance, underneath a cargo unit and then lift the cargo unit such that it does not touch the floor itself or any parts connected with the floor. A cargo unit receiving device may be, for instance, an air cushion, which uses compressed air to inflate an air pillow, which is adapted to lift and lower the cargo unit. Another example may be that the transport device moves next or besides the cargo unit and lifts the cargo unit using clamps, braces or similar means.

In an embodiment of the present disclosure, an automated cargo transportation arrangement for moving a cargo unit within an aircraft cargo compartment comprises a first and a second transport device. An advantage can be that such a coupled or combined transport device arrangement may provide an advantageous shape for receiving a cargo unit and can further support a movement behaviour, which allows flexible movement possibilities on a floor of a cargo compartment. Furthermore, different functions or modules can be provided and positioned on different transportation devices. For example, a centralized power supply unit may be provided in one transport device or sub-device, whereas the other transport device or sub-device may contain drives, a control unit or other parts. In other words, the transport devices, arranged in a transport arrangement may not be necessarily identical.

In an embodiment, the transport device is mechanically and/or electrically coupled to the second transport device by a coupling. The coupling may allow interaction and control between the connected transport devices. Furthermore, certain parts or functions which are implemented on one transport device may be also used on the second transport device. This may avoid doubling of functions and parts and may therefore reduce cost.

In an embodiment of the present disclosure, a position of the first and second transport device relative to each other is changeable by displacing the coupling between the first and second transport device. In other words, as the first and second transport device are connected to each other via the coupling, a position change relative to each other may achieved by moving or sliding the coupling along the edges of the first and second transport device. A distance between the first and second transport device may not change and kept constant during the displacement process. An advantage may be seen in the possibility of different moving directions of the first and second transport device. Furthermore, a moving track of a transport arrangement, which performs a rectangular movement, may be kept exactly orthogonal to save space and keep, for instance, a cargo compartment floor structure simple. Electrical or further connections will be maintained while moving the coupling.

In an embodiment of the present disclosure, rounded edges are provided at the first and second device at a position transversely to each other across the coupling, when both devices are positioned on the same longitudinal axis. In other words, during a displacement of the coupling, two rounded edges of the opposing transport devices locate across to each other. This may allow a continuous movement of the transportation arrangement while performing a direction change, for instance, by about 90 degrees. The coupling may be locked or arrested using a locking mechanism. The linkage or coupling between the first and the second transport device may comprise round bearings for guiding the mechanical linkage between the transport devices and keep a friction between the moving past low.

In an embodiment, the rounded edges are formed such that both couplings can be simultaneously displaced along the rounded edges of the first and second transport device such that a horizontal angular orientation of the first and of the second transport device relative to a longitudinal cargo floor direction is maintained. Because the respective edges of the first and the second transport device have curves arranged in opposing directions, a simultaneously moved coupling on both sides of the coupling may respectively compensate an angular orientation change of a transport device such that an angular position of the first transport device relative to an angular position of the second transport device is offset and therefore maintained. An advantage may be seen in a reduction of required space for moving the vehicles because no additional space is necessary for performing a direction change of a rectangular transport device. By maintaining the orientation and avoiding a rotation of a transport device, the required space, for example, when changing a movement direction, may be minimized.

In an embodiment of the present disclosure, the transportation arrangement further comprises a third transport device, wherein the transport devices of the transportation arrangement are arranged in series relative to each other. A combination of three transport devices may be advantageous to match a length or width of a base plate of a ULD to allow an advantageous weight distribution. Furthermore, one transportation arrangement may be used in combination with a second transportation arrangement to, for instance, provide receiving of a ULD on two sides of the base plate. This may reduce an individual ULD weight to be carried by one transport arrangement.

In an embodiment of the present disclosure, a method for providing a transportation arrangement at a start position on a floor of a cargo compartment and for loading a cargo unit into the cargo compartment of an aircraft is provided. The method comprises providing a transportation arrangement at an entrance area of the aircraft floor, wherein the transport devices are arranged in series in a direction transversally to a longitudinal direction of the aircraft floor. The transportation arrangement moves transversally to the longitudinal floor direction. A displacing of a transport device relative to a following coupled transport device takes place such that the transport device moves in the longitudinal direction. The transportation arrangement is positioned at a start position such that the transportation arrangement can receive a cargo unit and is arranged to move in the longitudinal direction.

According to an embodiment of the present disclosure, in the displacing the first transport device, a horizontal angular orientation of the first and second transport device relative to the longitudinal floor direction is maintained. In other words, the transport devices do not rotate during the displacing of the first transport device relative to the second transport device.

In an embodiment of the present disclosure, the displacing the first transport device comprises an opening and/or closing of a locking system between the first and second transport device. A locking system may help to stabilize a movement and avoid an unwanted displacing of the coupling.

The various teachings of the present disclosure may be used in combination with a fully automated locking system, which may allow locking and unlocking of cargo units at their target position to avoid movement of the cargo units during a flight. Such fully automated loading system may further comprise one or more control units.

In an embodiment of the present disclosure, the method further comprises: The cargo unit is received by the transportation arrangement. The transportation arrangement moves with the cargo unit to a target position. The cargo unit is deposited by the transportation arrangement such that the cargo unit rests on the target position.

It has to be understood that features of the method as described in the above and in the following may be features of the transport device or transport arrangement in the above and in the following. If technically possible, but not explicitly mentioned, also combinations of embodiments of the present disclosure described in the above and in the following may be embodiments of the method and the transport device and transport arrangement.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 5A to 5F show a method for loading and positioning two automated cargo transportation arrangements according to the various teachings of the present disclosure within an aircraft.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. In addition, the illustrations in the figures are schematic and are not to scale.

Figure 1:
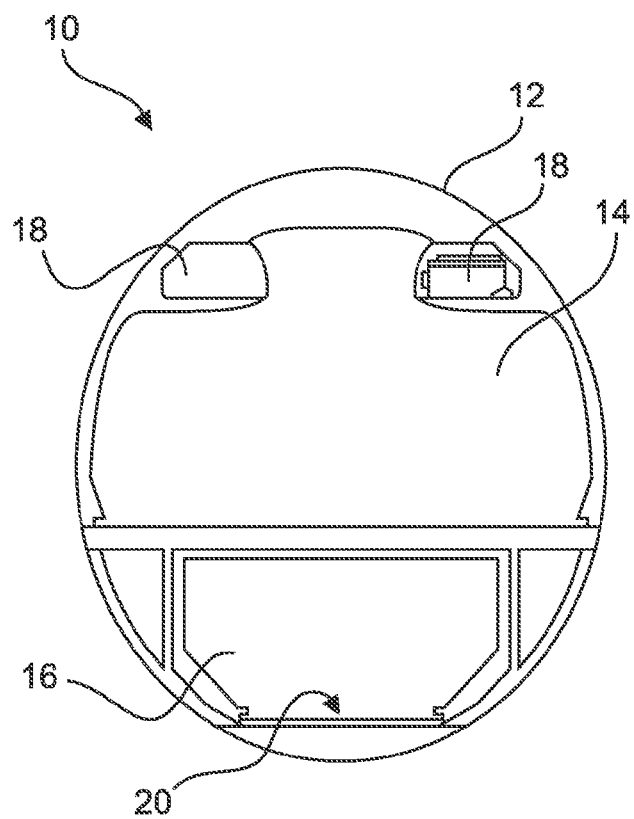
FIG. 1 shows a cross-sectional view of an aircraft with a passenger area and a cargo compartment.

FIG. 1 schematically shows a cross-sectional view of an aircraft fuselage 10 with an outer wall 12, a passenger area 14, and a cargo compartment 16. The cargo compartment 16 may be located underneath the passenger area, but may also locate next to a passenger area on the same level or may also be located in any other part of an aircraft. The passenger area 14 may further comprise overhead luggage compartments 18, for instance, to accommodate passenger hand luggage. The cargo compartment 16 may have a cargo compartment floor 20, on which cargo units (not shown) may be moved along or across the cargo compartment floor 20. As shown in FIG. 1, a height of the cargo compartment 16 may be lower than a height of the passenger area 14, which may cause a more difficult access to the cargo compartment 16 for operators. The shape of a cargo unit (not shown) may be adapted in cross-section to approximately fit the cross-sectional shape of the cargo compartment 16 in order to optimize the space, which may be used for storing and transporting cargo.

Figure 2:
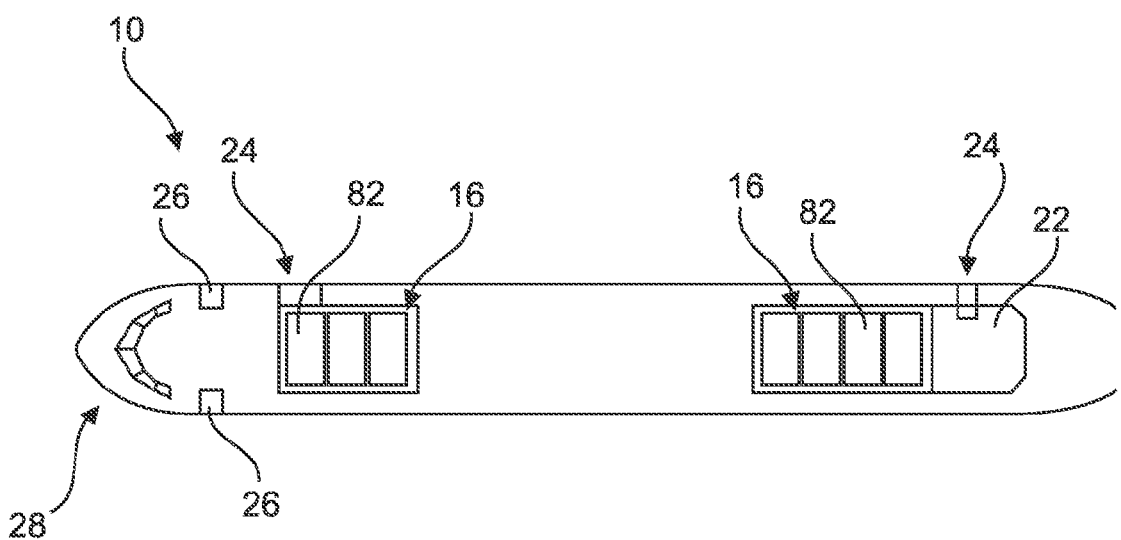
FIG. 2 shows a top-down view of a cargo compartment level within an aircraft.

In FIG. 2, now a longitudinal cross-sectional view of a cargo compartment 16 within an aircraft fuselage 10 is shown. In this example, the aircraft fuselage 10 may comprise two separate cargo compartments 16, wherein each accommodates a number of cargo units 82. A bulk cargo compartment 22 may be used to accommodate, for instance, non-ULD cargo. The respective cargo compartments 16 may be accessed from outside the aircraft fuselage 10 through cargo doors 24. These cargo doors 24 may only be used for cargo, whereas the aircraft fuselage 10 further comprises passenger doors 26 for passengers entering or leaving the aircraft fuselage 10. The aircraft fuselage 10 further comprises a cockpit area 28, which indicates a flight direction.

Figure 3:
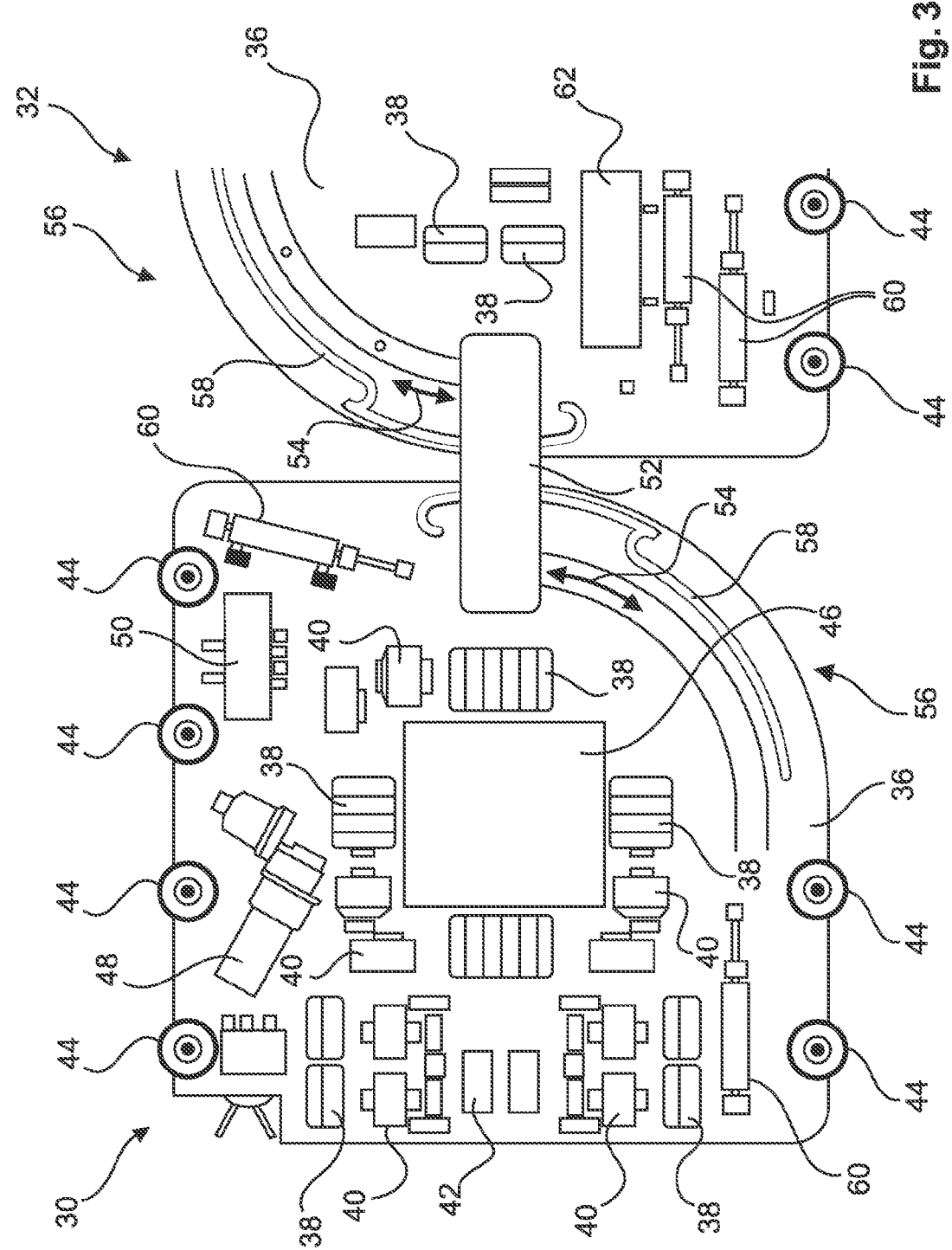
FIG. 3 shows a top-down view of an automated transport device according to the various teachings of the present disclosure coupled to a second transport device.

FIG. 3 shows a schematic and simplified top-down view of an example of a transport device 30 according to the various teachings of the present disclosure, which is coupled to a second transport device 32. The first transport device 30 comprises a base body 36, which is adapted to carry a cargo unit (not shown). Furthermore, the first transport device 30 comprises shifting means, in one example, a plurality of driven and not driven omni-directional wheels 38, which may be mounted substantially parallel to a longitudinal or transversal axis of the first transport device 30. Alternatively, a mounting of the wheels 38 in a direction oblique or transversely to the longitudinal or transversal axis is possible. The arrangement of the wheels 38 in different direction may allow movement of the first transport device 30 in different directions. For the purpose of better understanding in the foregoing and in the following, the following directions are defined: An x-direction describes a longitudinal direction of the aircraft fuselage and consequently a +x-direction indicates a direction in flight direction, whereas −x indicates a direction opposite to the flight direction. A y-direction describes a direction in a horizontal plane of the cargo compartment floor perpendicular to the x-direction. For instance, a +y-direction describes a movement perpendicular to the flight direction from a cargo door 24 area to an inner area of the cargo compartment 16. A −y-direction indicates the opposite movement from an inner area of the cargo compartment 16 towards, for instance, a cargo door 24 perpendicular to the x-direction. A z-direction describes a vertical direction perpendicular to a floor level plane of the cargo compartment 16. In other words, the z-direction may refer to an up/down direction, whereas a +z-direction may mean a lifting upwards from a floor level, and a −z-direction may indicate a lowering down to a floor level in vertical direction.

The wheels 38 which are arranged at different positions of the base body 36, and which are arranged in different directions may be adapted to allow a movement of the first transport device in different x/y-directions. The driven wheels 38 may be mechanically connected to drives 40, which may be, for instance, electromechanical motors or similar suitable driving mechanism. The drives 40 may be controlled by a control unit, which may have a communications connection to a centralized loading system control unit (not shown). The first transport device 30, as well as the second transport device 32, comprises guiding rollers 44 which may minimize friction between the base body 36 and an edge of the cargo compartment floor 20 (see FIG. 1). For instance, the transport device 30, 32 may move in a lowered channel of the cargo compartment floor 20 forming sidewalls, on which the guiding rollers move along during a motion of the transport device 30, 32. An air cushion 46 is arranged on an upper surface of the base body 36. The air cushion 46 may be adapted to support a cargo unit (not shown) such that it carries the cargo unit by lifting it above the base body 36. This height is higher than a highest point of the base body 36 or any parts mounted to the base body 36 in order to avoid mechanical contact of the cargo unit with parts of the base body 36. For this purpose, the air cushion 46 may be inflated with air by an air pump 48, which generates compressed air for lifting a cargo unit by the air cushion 46. A lowering in a direction towards a surface of the base body 36 may be achieved by valves 50, which may be adapted to release air from the air cushion 46.

Further referring to FIG. 3, an illustration of the coupling mechanism 52 is shown. For providing a connection between the first transport device 30 and the second transport device 32, a coupling 52 is provided. The coupling 52 is movably connected to the base body 36 of the first transport device 30 and, with another end or side of the coupling 52, movably connected to the base body 36 of the second transport device 32. The term "movably connected" may refer to maintaining a constant distance between the first transport device and the second transport device while allowing a displacement or shifting along a circular path 54 along at least a section of an edge 56 of the base body. In an example, an angular orientation of the coupling 52 relative to the base body 36 may be maintained during a motion of the coupling 52 along the circular path 54. The displacement of the coupling 52 may allow a position change of the transport devices 30, 32 relative to each other, while a movement of the coupling 52 may happen at the first transport device 30 and simultaneously on the second transport device 32. The rounded edges 56 of the first transport device 30 and of the second transport device 32 are provided respectively at a position transversely to each other across the coupling 52, when both devices 30, 32 are positioned on the same longitudinal axis. This may allow a simultaneous displacement of the coupling along the circular path 54 of the rounded edges 56 such that a horizontal angular orientation of the first and of the second transport device 30, 32 relative to an x-direction of the cargo floor 20 (see FIG. 1) is maintained. The coupling 52 may, furthermore, provide linkage for other media such as compressed air, fluid, but also electrical or data connections. In order to avoid damages of the cabling 58, the cabling 58 is arranged as an e-chain providing controlled bending of the cabling 58. The compressed air or pneumatic or hydraulic connections may be provided by hoses or any other suitable means. For the ease of loading and unloading a cargo unit on or off a transport device 30, 32, a locking mechanism 60 may be foreseen. This may reduce a complexity of a loading and unloading procedure of a cargo unit (not shown). The locking mechanism may comprise actuators 60, which mechanically lock the coupling 52 and the base body 36 to avoid any displacement or moving of the coupling 52. The actuator 60 may also be configured to displace the coupling. For instance, during a movement of the first transport device 30 and the second transport device 32, the coupling 52 may be locked to increase stability of the combined transport devices 30, 32. If a position of the transport devices 30, 32 relative to each other is changed, the locking mechanism 60 may be opened in order to allow a sliding or displacing of the coupling 52 along the rounded edges 56. The coupling 52 may be re-locked again to stabilize the vehicle or transport arrangement. The rounded edges 56 in combination with the circular path 54 may comprise round bearings for guiding the mechanical linkage between the transport devices 30, 32, in one example, for guiding the coupling 52 with low friction.

The second device 32 may be equipped in a different manner. For instance, a battery 62 may serve as power supply for the second transport device 32, but also, through the electrical linkage across the coupling 52, also provide electrical power to parts located on the first transport device 30. In an example, the battery 62 may be a rechargeable battery, which may be reloaded after a loading or unloading sequence during a ground stop of the aircraft. Instead of a battery or rechargeable battery, also other power supply options may be possible. A charging of the battery 62 may, for instance, be provided by an inductive coupling in the cargo compartment floor 20.

Figure 4:
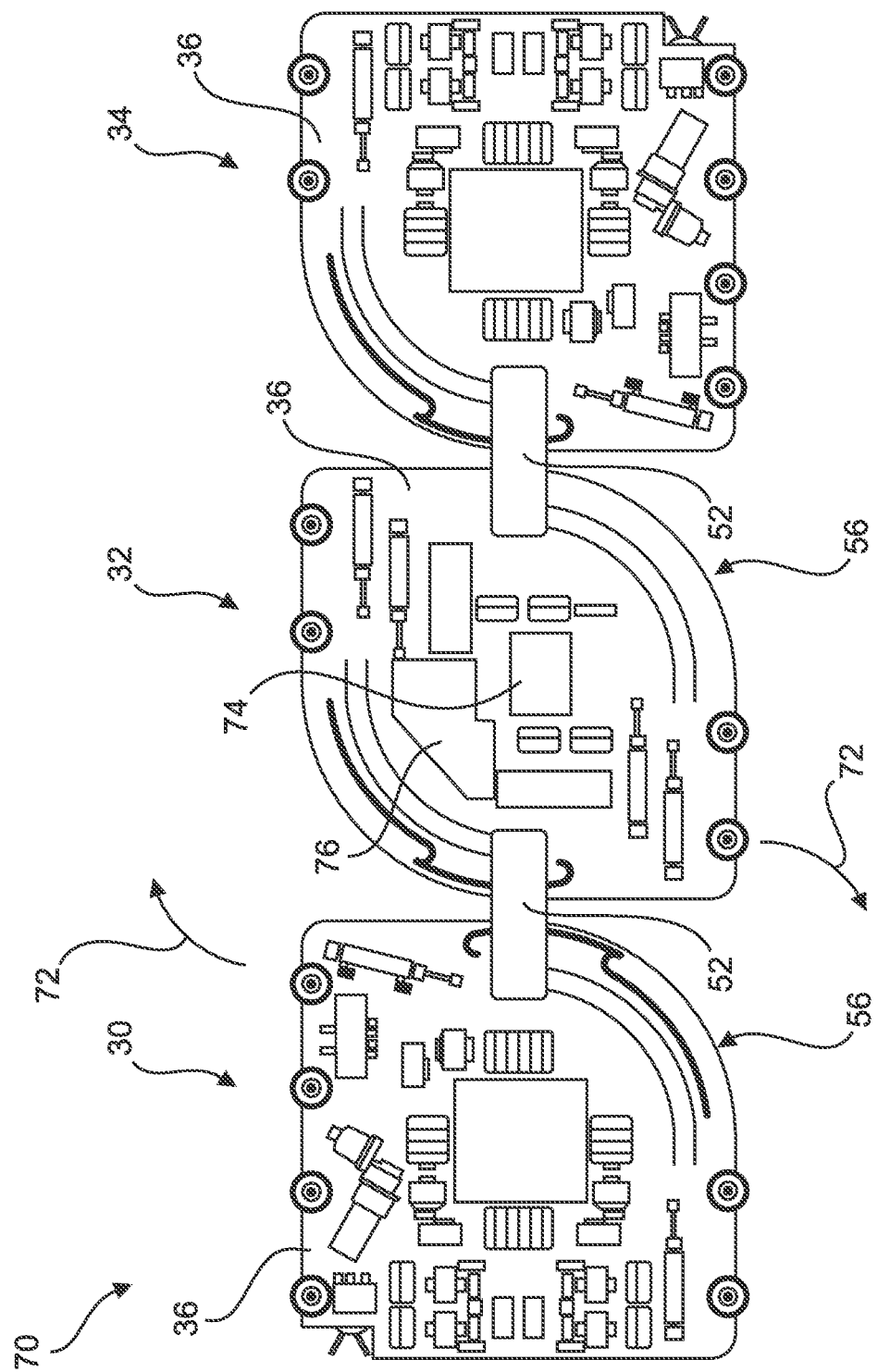
FIG. 4 shows a transportation arrangement with three transport devices according to the various teachings of the present disclosure.

In FIG. 4, an automated cargo transportation arrangement 70 for moving a cargo unit (not shown) within an aircraft cargo compartment 22 is depicted. The transportation arrangement 70 comprises a first transport device 30, a second transport device 32, and a third transport device 34. The transport devices 30, 32, 34 are coupled to each other via couplings 52, which provide a mechanical, electrical, and/or pneumatic or hydraulic connection between the transport devices 30, 32, 34. The transport devices 30, 32, 34 are arranged in series, whereas a position of the transport devices 30, 32, 34 may be changed relative to each other by displacing the coupling 52 along the respective rounded edges 56. The arrows 72 indicate a displacement direction of two respective neighboring transport devices 30, 32, 34 as an example. The same overall dimensions of a transportation arrangement 70 with three transport devices 30, 32, 34, may allow corresponding advantageously to the dimensions of a bottom plate of a cargo unit. In an example, a transport device 30, 32, 34 may have a length of about 50 cm and a breadth of about 50 cm, which corresponds to a total length of a three-part transportation arrangement 70 of about 150 cm.

The transportation arrangement 70 may be provided in combination with a second transportation arrangement 70 which may be, in an example, located parallel next to each other, while commonly carrying one cargo unit. For example, a first transportation arrangement 70 may be positioned along a left longitudinal edge on the bottom plate of a cargo unit, and a second transportation arrangement 70 may be positioned at a right longitudinal edge of a cargo unit. In this way, a distribution of a weight of the cargo unit may be advantageously distributed across the transportation arrangements 70 and the individual transport devices 30, 32, 34. The two transportation arrangements 70 may communicate directly with each other, for instance via a wireless data connection. This may allow a synchronization of the movement and any activities performed by the individual transportation arrangements 70 and respective transport devices 30, 32, 34. In an example, a communication between two commonly used transportation arrangements 70 may only be performed in a direct manner, without involving a centralized control unit or a loading system control unit. The transportation arrangement 70 may communicate via a data connection with a loading system control unit (not shown). In an example, there will not be any type of interaction between the transportation arrangement 70 or any transport device 30, 32, 34, with other sub-systems of the aircraft in order to reduce the needed interfaces and costs. The synchronization of both transportation arrangements 70 relative to each other may be performed in a direct manner in order to avoid delays in the forwarding of data to avoid impacts on the vehicle synchronization. The communication between the transportation arrangements 70 and/or between transport devices 30, 32, 34 may be performed, for instance, via wireless means. The rounded edges and the couplings are formed such that a leading transport device 30, 32, 34 may change a moving direction while the following transport device 30, 32, 34 may continue a linear path. In other words, for performing a direction change of the transportation arrangement 70, no curved area of the track is necessary and the track shape may have an exact orthogonal shape, which may simplify a structure of a cargo compartment floor 20 and thus lower cost.

The shown example in FIG. 4 contains three transport devices 30, 32, 34, whereas the first transport device 30 and the third transport device 34 are identical, but rotated by about 180 degrees. The middle or second transport device 32 comprises a different set of parts. In one example, the second transport device 32 comprises a power drive unit (PDU) 74. In an example, the power drive unit 74 is a cylindrical roll or wheel, which longitudinal rotational axis is arranged in a longitudinal direction of the transportation arrangement 70. The power drive unit 74 may, for instance, be raised lowered relative to the base body 36. In the raised position, the power drive unit 74 may pull a cargo unit in a direction transversely or orthogonally to a longitudinal direction of the transportation arrangement 70 above the transportation arrangement 70 such that it may be carried and transported by the transportation arrangement 70. The power drive unit 74 may start rotating, for instance, if a bottom plate of a cargo unit is detected at the power drive unit 74. A PDU 74 may be, for example, driven by an electromechanical motor. The second transport device 32 further comprises a control unit 76. In one example, the control unit 76 is adapted to control all transport devices 30, 32, 34 by using the electrical and data connections between the transport devices 30, 32, 34. In one example, the control unit 76 is configured to communicate with an aircraft loading system control unit (not shown) and/or to communicate with a second or any further transportation arrangement 70 for synchronization purposes.

In FIGS. 5A to 5F, a method for loading two transportation arrangements into a cargo compartment 16 of an aircraft fuselage 10 is shown. In FIG. 5A, a first transportation arrangement 70A and a second transportation arrangement 70B are provided at an entrance area outside the aircraft fuselage 10 in front of a cargo door 24. This may be done by, for instance, a cargo loader, which operates outside the aircraft. The transportation arrangements 70A, 70B are lifted on the cargo door level. The first transportation arrangement 70A is manually positioned in front of a gap in flex-downs. This may be performed by operating staff, which is located outside the cargo compartment 16. The cargo compartment comprises two floor channels 78A and 78B.

Referring to FIG. 5B, the first transportation arrangement 70A moves in +y-direction (see FIG. 3) until a marking 80A is detected. At this point, the transportation arrangement 70A stops and a locking mechanism (see FIG. 3) between the first leading transport device 30 and a coupled second transport device 32 is opened. Turning to FIG. 5C, the first transport device 30 starts moving in +x-direction, while the other two transport devices 32, 34 move further in +y-direction. The second transport device 32, once arrived at the marking 80A, starts moving in +y-direction, whereas the third transport device 34 continues moving in +x-direction. Once the third transport device 34 detects the first marking 80A, the third transport device starts moving in +y-direction. In an example, before performing a direction change, the locking mechanism 60 between the first transport device 30 and the second transport device 32 and the locking mechanism 60 between the second transport device 32 and the third transport device 34 is opened, and after concluding the direction change, is closed again. This may allow maintaining a stability of the entire transportation arrangement 70 after changing its direction. During the direction change process, the shape of the transportation arrangement 70A, 70B changes from straight to an L-shaped design and then, after conclusion of the direction change, to a straight shape again. The first transportation arrangement 70A has, as shown in FIG. 5D, a straight shape in a direction longitudinal to the floor direction of the cargo compartment floor 20. The first, second, and third transport device 30, 32, 34 do not change their orientation, or in other words, do not rotate around an own axis. The direction change of the transportation arrangement 70A may, due to the rounded edges and the displaceable couplings, be performed without requiring additional curve space on the cargo compartment floor 20.

Turning to FIG. 5E, the transportation arrangement 70A now moves in −x-direction until the second transport device 32 detects the first marking 80A. In this way, the middle or second transport device 32 is positioned such that it faces the cargo door and is positioned in front of the opening in the flex-downs.

In FIG. 5F, the second transportation arrangement 70B is shown in its final position. Analogous to the position of the first transportation arrangement 70A, with the difference, that the first transportation arrangement 70A is located in the first floor channel 78A, whereas the second transportation arrangement 70B is located and positioned in the second floor channel 78B. Both transportation arrangements may now move in +x- or −x-direction and are ready to receive cargo units for shifting the cargo units (not shown) within the cargo compartment 16. For loading the second transportation arrangement 70B, the method as shown in FIG. 5A to FIG. 5E are repeated in the same manner, with the only difference being that different markings are used as reference. For example, instead of the first marking 80A, analogously the second marking 80B (see FIG. 5A) is used. The markings may be detected via suitable sensors arranged at the transport devices 30, 32, 34.

Figure 6A:
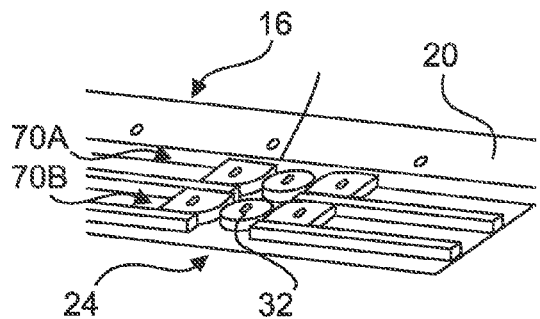
FIGS. 6A to 6H show a method for loading a cargo unit using two transport arrangements according to the various teachings of the present disclosure.
Figure 6B:
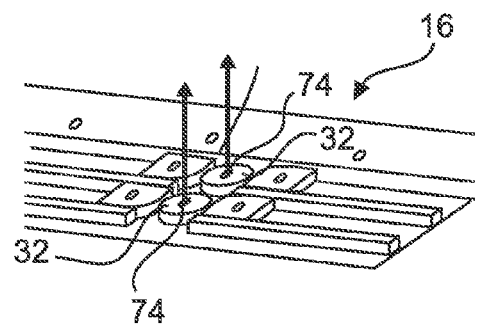
Figure 6C:
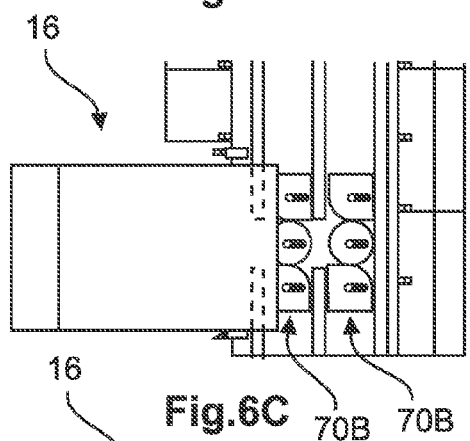
Figure 6D:
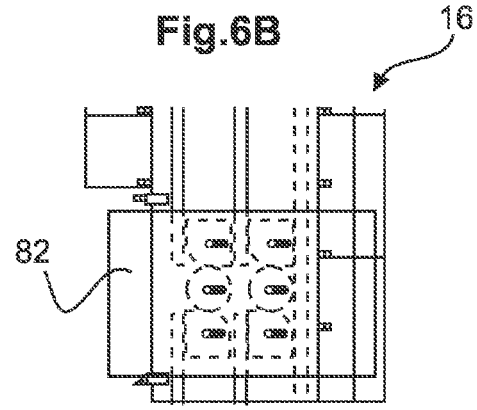
Figure 6E:
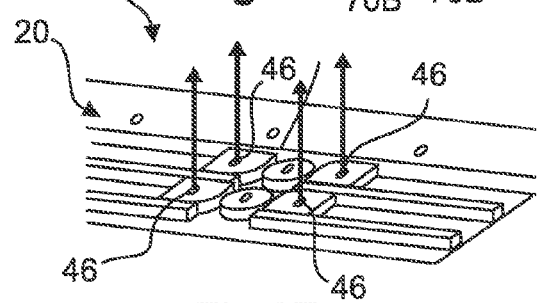
Figure 6F:
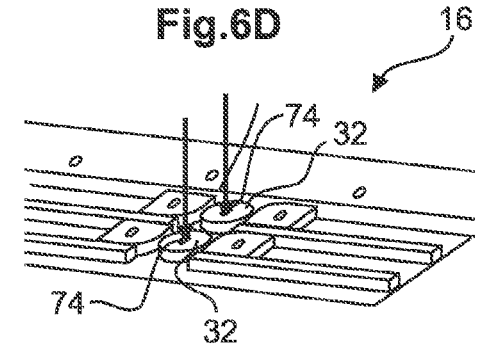

In FIG. 6A to FIG. 6H, a method for loading a cargo unit according to the various teachings of the present disclosure are shown. In FIG. 6A, the first and second transportation arrangement 70A, 70B are, analogously to FIG. 5F, positioned in the cargo compartment 16 on a cargo compartment floor 20. The second transportation arrangement 70B faces with its second transport device 32 a cargo door 24 area. The two transportation arrangements 70A, 70B are now able to move in +x- and −x-direction. In FIG. 6B, it is indicated, that the power drive units 74 of the second transport device 32 are lifted, once a cargo unit is moved over the power drive unit 74. In other words, the drives in the power drive unit 74 are triggered—started and the cargo unit (not shown) is conveyed in +y-direction until a latch (not shown) is reached. The latch serves as mechanical stop and detection for a maximum movement in +y-direction. Such latch may be a vertical clamp or similar, which allows a mechanical stop for the movement in y-direction. Once the cargo unit 82 has moved in +y-direction and has reached an end position in y-direction (see FIG. 6C and FIG. 6D), the cargo unit 82 is lifted using air cushions 46 as shown in FIG. 6E. Now, the cargo unit 82 is located above floor level of the cargo compartment floor 20. As shown in FIG. 6F, now the power drive units 74 of the second transport device 32 are lowered and have therefore no mechanical connection anymore to the cargo unit 82 (not shown).

Figure 6G:
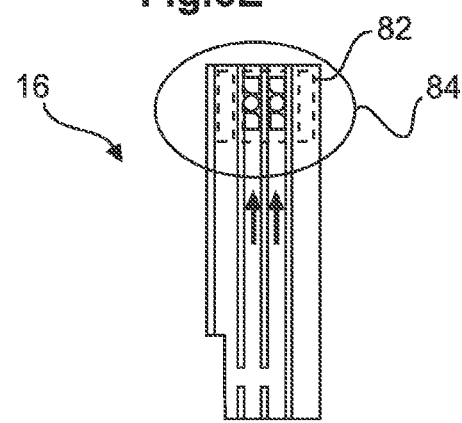
Figure 6H:
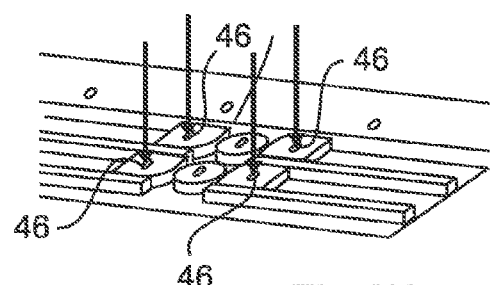

Now turning to FIG. 6G, the transportation arrangements 70A, 70B haven been moved to a target position 84 in the cargo compartment 16. The location of the target position 84 may be detected by sensors using or detecting markings in the flex-downs. In one example, flex-downs contain a plurality of markings and read sensors count markings to identify and distinguish different positions within the cargo compartment floor 20. In one example, once a predetermined marking is reached, the transportation arrangements 70A, 70B begin to slow down or decrease their speed. For example, a latch may be raised in a previous step to provide a mechanical stop for the transportation arrangements 70A, 70B. After the target position 84 and/or mechanical stops are detected, the transportation arrangement stops, and the air cushions (see FIG. 6H) are lowered such that the cargo unit 82 (not shown) rests on, for instance a support structure of the cargo compartment floor 20. This may allow the transportation arrangements 70A, 70B to release mechanical contact to the cargo unit 82 and may allow a removal of the transportation arrangement 70A, 70B from the cargo unit 82. The transportation arrangements then may return or move back to the door area position (see FIG. 6A) and prepare to receive the next cargo unit 82.

For unloading a cargo unit 82 from a cargo compartment 16 of an aircraft, the method is applied analogously in a reversed manner.

In one example, a communication between a transportation arrangement, or a plurality of transportation arrangements 70A, 70B, or transport devices 30, 32, 34 with a loading system control unit may contain for example, the following. In a first example, two transportation arrangements 70A, 70B (see FIGS. 5A-5F and 6A-6H) may contain the following: In a first step, the loading system control unit sends the message to the transportation arrangements 70A, 70B, that the cargo compartment 16 is ready for receiving the transportation arrangements 70A, 70B. Then, the first transportation arrangement 70A and then following the next transportation arrangement 70B enter the cargo compartment 16. The first transportation arrangement 70A informs the loading system control unit that an end position is reached, then the second transportation arrangement 70B sends the message to the loading system control unit, that the end position is reached. In a following step, both transportation arrangements 70A, 70B inform the loading system control unit that they are ready to receive a cargo unit.

A method for loading cargo units into a cargo compartment 16 of an aircraft fuselage 10 may comprise the following communication between different elements and components of the aircraft and the loading system control unit. In a first step, the loading system control unit informs the transportation arrangements 70A, 70B that a cargo unit 82 enters the cargo compartment 16. Then the transportation arrangement 70A, 70B receives the cargo unit 82. Then the first transportation arrangement and then the second transportation arrangement 70A, 70B announce to the loading system control unit that the cargo unit 82 is received. In a next step, the loading system control unit informs the transportation arrangement 70A, 70B to which target position the cargo unit 84 is supposed to be transported. The transportation arrangements 70A, 70B announce readiness to move in x-direction. The loading system control unit then sends a clearance to the transportation arrangement 70A, 70B to move. The transportation arrangements 70A, 70B start moving. During the movement, the first transportation arrangement 70A communicates with the second transportation arrangement 70B for synchronization purposes. Once the target position 84 is reached, the loading system control unit sends a message to the transportation arrangement 70A, 70B that the cargo unit 82 is lowered. After lowering the cargo unit 82, the loading system control unit sends a command to the locking system for locking the cargo unit 84. The locking system sends a message to the loading system control unit, whether the locking procedure has been successful or not. If not, the locking procedure is repeated. Then the loading system control unit sends a command to the transportation arrangement 70A, 70B to return to the initial position. After the transportation arrangement 70A, 70B has reached the end position, the transportation arrangements 70A, 70B announce this accordingly to the loading system control unit. In a next step, the transportation arrangements 70A, 70B inform the loading system control unit that they are ready to receive a next cargo unit 82. For further cargo units 82, this process is repeated. The unloading of cargo units and the unloading of the transportation arrangements of the aircraft is done in a reversed manner analogously to the described method.

Figure 7:
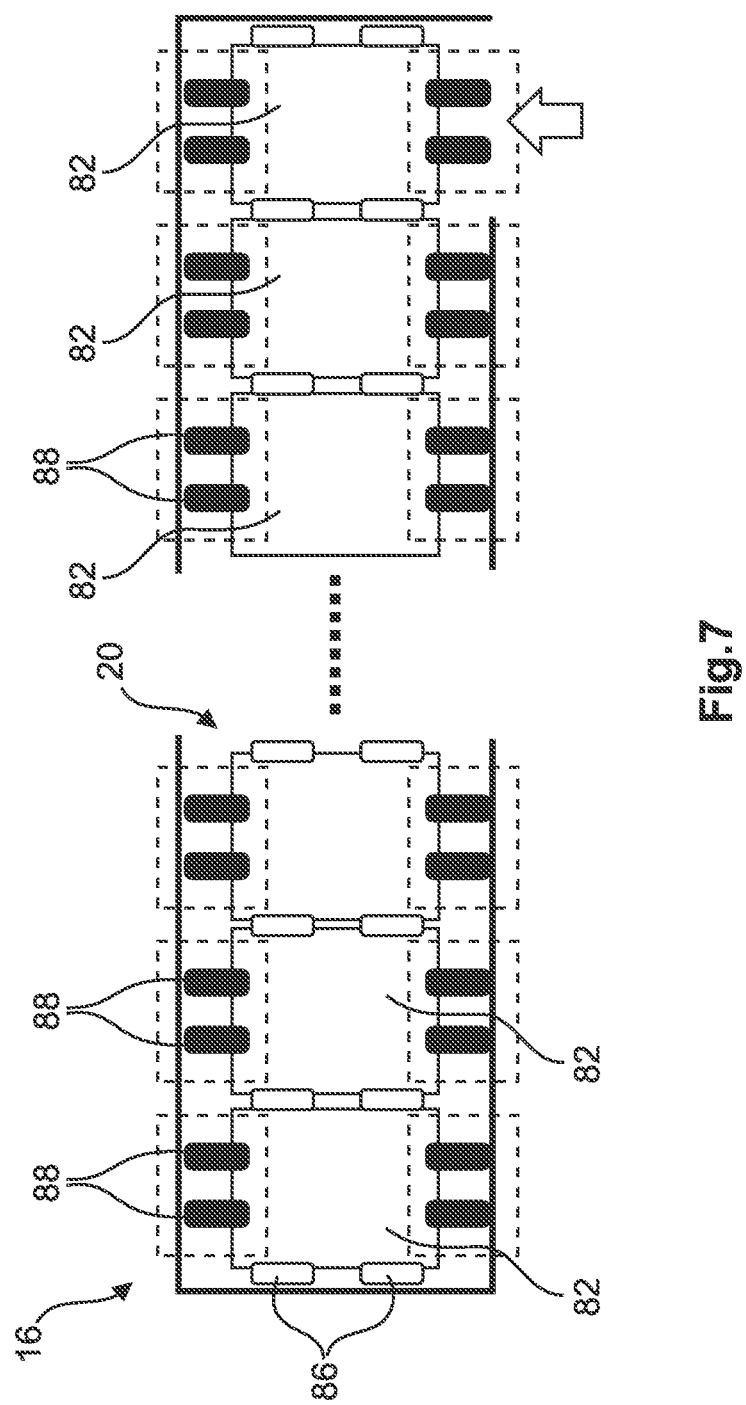
FIG. 7 shows an example of a locking system for cargo units in a cargo compartment of an aircraft using latches.

In FIG. 7, a locking system for cargo units 82 on a cargo compartment floor 20 of a cargo compartment 16 is shown. Once the cargo units 82 are positioned at their respective target positions 84 (see FIG. 6G), they need to be locked such that they cannot move during flight. The shown locking system relates to a locking of cargo units 82 at the cargo compartment floor 20 using fully automated cargo unit locking. The locking parts comprise x-latches 86 and yz-latches 88. X-latches provide a locking of a cargo unit 82 to prevent movement in x-direction, whereas yz-latches provide a locking and fixation of a cargo unit or several cargo units 82 in y- and/or z-direction. In the shown example, for each cargo unit 82, four x-latches and four yz-latches are foreseen. Latches may be electromechanically driven and may be raised up or lowered down via electromechanical motors or similar suitable means. An advantage may be that there is no human operator required within the cargo compartment 16.

The x-latch 86 locks a cargo unit in x-direction. In one example, one latch may be driven by one electromechanical actuation unit (not shown). The lock and unlock position of each latch may be held securely by a pivotable magnetic spring (not shown). The yz-latches are adapted to lock the cargo units in z- and in y-direction. Two different types of xy-latches may be provided. A 2-spant latch is used, where the cargo unit 82 is located above two support frames of the cargo compartment floor 20. Each latch may include a guiding roller to support the cargo unit 82 in y-direction. In one example, one electromechanical actuation unit drives two latches 88, 86.

In one example, a 3-spant yz-latch is used, where the cargo unit 82 is located above three support frames of the cargo compartment floor 20. Each latch 88, 86 may include a guiding roller to support the cargo unit 82 in y-direction. The drive shaft may be centrally supported. In one example, one electromechanical actuation unit will drive two latches 88, 86.

The yz-latch 88 may, in an example, have two independent sensor systems to detect a locking or an unloading position. Hall sensors may detect the position of the magnetic spring. In one example, two proximity sensors may be located at the struts of the latch to detect their position. Due to its more compact construction and the missing levers, the x-latch 86 may be only equipped with the hall sensors at the magnetic spring.

The functional modules may be implemented as a programmed software module or procedures, respectively. However, one skilled in the art will understand that the functional modules may be implemented fully or partially in hardware.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An automated transport device for moving a cargo unit within a cargo compartment of an aircraft, comprising:
    a base body to carry the cargo unit;
    a shifting device to generate a movement of the base body along a floor of the cargo compartment perpendicular to a longitudinal axis of the aircraft and, after that, along the longitudinal axis of the aircraft without rotation of the base body;
    a coupling for providing at least one of an electrical, a mechanical and a fluid link to a second transport device;
    wherein a position of the coupling is displaceable along at least a section of an edge of the base body.

2. Transport device according to claim 1, wherein the position of the coupling is displaceable such that a coupling direction towards the second transport device is changeable by at least 90 degrees.

3. Transport device according to claim 1, wherein the section of the edge has a rounded shape such that the coupling is displaceable along a circular path.

4. The transport device according to claim 1, wherein the transport device further comprises:
    a cargo unit receiving device to lift the cargo unit above the cargo compartment floor level and to lower the cargo unit such that the cargo unit rests on the target position.

5. An automated cargo transportation arrangement for moving a cargo unit within a cargo compartment of an aircraft, comprising:
    a first transport device for moving a first cargo unit within the cargo compartment, including a first base body to carry the first cargo unit and a first shifting device to generate a movement of the first base body along a floor of the cargo compartment perpendicular to a longitudinal axis of the aircraft and, after that, along the longitudinal axis of the aircraft without rotation of the base body; and
    a second transport device for moving a second cargo unit within the cargo compartment, including a second base body to carry the second cargo unit and a second shifting device to generate a movement of the second base body along the floor of the cargo compartment.

6. The transportation arrangement according to claim 5, wherein the first transport device is at least one of mechanically and electrically coupled to the second transport device by a coupling.

7. The transportation arrangement according to claim 6, wherein a position of the first transport device and the second transport device relative to each other is changeable by displacing the coupling between the first transport device and the second transport device.

8. The transportation arrangement according to claim 6, wherein rounded edges are provided at the first transport device and the second transport device at a position transversely to each other across the coupling, when both the first transport device and the second transport device are positioned on the same longitudinal axis of the aircraft.

9. The transportation arrangement according to claim 8, wherein the rounded edges are formed such that the coupling can be simultaneously displaced along the rounded edges of the first transport device and the second transport device such that a horizontal angular orientation of the first transport device and of the second transport device relative to a longitudinal cargo floor direction is maintained.

10. The transportation arrangement according to claim 5, wherein the transportation arrangement further comprises a third transport device;
    wherein the first transport device, the second transport device and the third transport device of the transportation arrangement are arranged in series relative to each other.

11. A method for providing a transportation arrangement at a start position on a floor of a cargo compartment and for loading a cargo unit into the cargo compartment of an aircraft, the method comprising the steps of:
    providing a transportation arrangement including a first transport device coupled to a second transport device at an entrance area of the floor of the cargo compartment, the first transport device and the second transport device arranged in series in a direction transversally to a longitudinal direction of a floor of the aircraft;
    moving the transportation arrangement transversally to the longitudinal direction of the floor;
    displacing the first transport device relative to the second transport device such that the first transport device moves in the longitudinal direction; and
    positioning of the transportation arrangement at a start position such that the transportation arrangement receives a cargo unit and is arranged to move in the longitudinal direction.

12. The method according to claim 11, wherein in the displacing of the first transport device, a horizontal angular orientation of the first transport device and the second transport device relative to the longitudinal direction of the floor is maintained.

13. The method according to claim 11, wherein the displacing of the first transport device comprises at least one of an opening and a closing of a locking system between the first transport device and the second transport device.

14. The method of claim 11, further comprising:
   receiving the cargo unit by the transportation arrangement;
   moving the transportation arrangement with the cargo unit to a target position;
   depositing the cargo unit by the transportation arrangement such that the cargo unit rests on the target position.

15. The transportation arrangement according to claim 5, wherein the first transport device further comprises:
   a cargo unit receiving device to lift the first cargo unit above the cargo compartment floor level and to lower the first cargo unit such that the first cargo unit rests on the target position.

\* \* \* \* \*